United States Patent [19]

Rostoker

[11] Patent Number: 4,541,842

[45] Date of Patent: Sep. 17, 1985

[54] GLASS BONDED ABRASIVE AGGLOMERATES

[75] Inventor: David Rostoker, Sturbridge, Mass.

[73] Assignee: Norton Company, Worcester, Mass.

[21] Appl. No.: 512,515

[22] Filed: Jul. 11, 1983

Related U.S. Application Data

[63] Continuation-in-part of Ser. No. 347,603, Feb. 10, 1982, abandoned, which is a continuation-in-part of Ser. No. 220,641, Dec. 29, 1980, abandoned.

[51] Int. Cl.$^4$ .............................................. B24D 3/00
[52] U.S. Cl. ...................................... 51/296; 51/298; 51/308
[58] Field of Search .......................... 51/296, 308, 298

[56] References Cited

U.S. PATENT DOCUMENTS

| Re. 29,808 | 10/1978 | Wagner | 51/296 |
| 2,216,728 | 10/1940 | Benner et al. | 51/298 |
| 4,311,489 | 1/1982 | Kressner | 51/298 |
| 4,350,497 | 9/1982 | Ogmau | 51/296 |

Primary Examiner—Paul Lieberman
Assistant Examiner—Willie Thompson
Attorney, Agent, or Firm—Rufus M. Franklin

[57] ABSTRACT

Particles of agglomerates of abrasive particles held in a porous glassy matrix are produced by mixing abrasive grits with known porous-glass forming compositions. In the resulting product the abrasive grits are held encapsulated within the thin walls of the porous body and tend to concentrate at the periphery of the body.

20 Claims, 2 Drawing Figures

GLASS BONDED ABRASIVE AGGLOMERATES

This invention is a continuation-in-part of my copending application Ser. No. 06/347,603, filed Feb. 10, 1982, now abandoned, which is a continuation-in-part of my prior application Ser. No. 06,220,641, filed Dec. 29, 1980, now abandoned.

FIELD OF THE INVENTION

This invention relates to particulate abrasive agglomerates in which abrasive grits are held in a friable matrix, such agglomerates being particularly suitable for use in coated abrasive products in which the agglomerates are bonded to a flexible sheet backing; they can also be used in bonded abrasives (grinding wheels).

BACKGROUND OF THE INVENTION

The use of small, particulate, agglomerates of relatively fine abrasive grits held in a matrix, for use as a substitute for conventional abrasive grits on a coated abrasive ("sandpaper") flexible abrasive, was suggested at least as early as the Jackson U.S. Pat. No. 2,194,472. So far as is known, the solid agglomerates of the type disclosed in the Jackson patent or products made from them have never been commercially successful. U.S. Pat. No. Re. 29,808, to Wagner, discloses hollow spheres (or other shapes, such as cylinders) consisting of abrasive grits bonded onto the outer surface of a friable matrix, such as resin or an inorganic silicate. Kressner copending application Ser. No. 06/129,186, now U.S. Pat. No. 4,311,489, filed Mar. 10, 1980, discloses solid agglomerates bonded by fused cryolite or other "salts or silicates". European published application No. 8868, published Mar. 19, 1980 is similar, and is based on the parent application of U.S. Ser. No. 06/129,186, now U.S. Pat. No. 4,311,489.

British Pat. No. 982,215 and U.S. Pat. No. 3,156,545, teach making solid agglomerates for use in grinding wheels consisting of glass bonded alumina or other grits. Benner U.S. Pat. No. 2,216,728 discloses glass or metal bonds for the matrix of aggregates containing diamond abrasive particles. The patent states that the matrix may be made somewhat porous to enhance mechanical bonding when the aggregates are mixed with a binder to form a grinding wheel, referring obviously to open porosity. Robie Pat. No. 2,806,772 suggests including foamed glass in abrasive agglomerates bonded by a resin matrix.

While abrasive agglomerates of the hollow resin or silicate bonded type have shown good results in coated abrasive applications, and agglomerates such as taught in the Kressner application show good results, both types of agglomerates are difficult or expensive to manufacture and it is difficult to control their friability.

SUMMARY OF THE INVENTION

Figure 1:
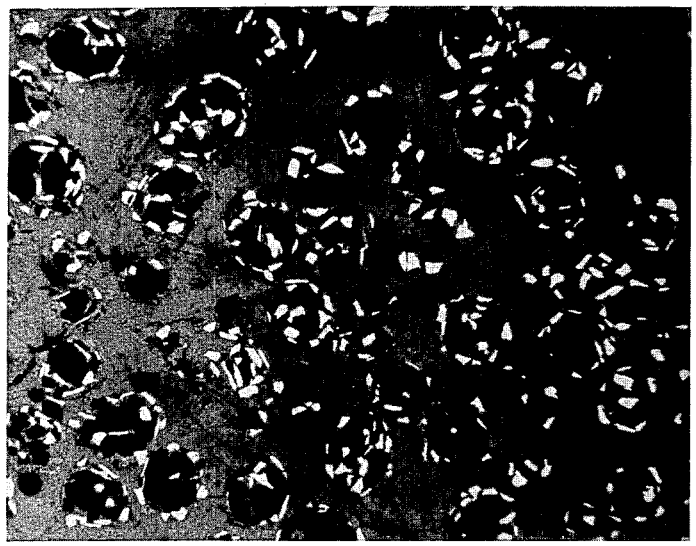
FIG. 1 is a photomicrograph of a random cross-section of agglomerates containing 180 grit (European Standard) silicon carbide fired at 890° C.
Figure 2:
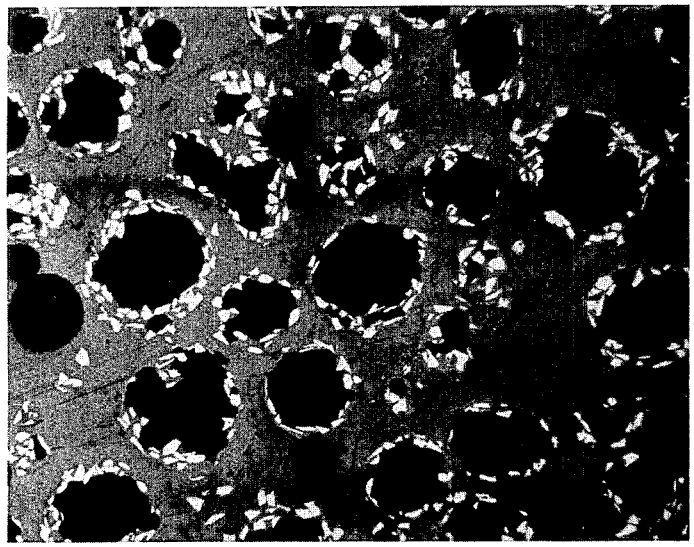
FIG. 2 is a random cross-section of this same product fired at 990° C. In these figures the darkest portion represents pores, and the lightest portion represents abrasive grits.

More control of the physical properties of abrasive agglomerates, and excellent grinding results in coated abrasives can be achieved by providing agglomerates of abrasive particles bonded by a foamed glass in which the abrasive particles are contained within the walls of the cellular glass matrix. Such agglomerates can be manufactured by mixing appropriate abrasive grits with conventional known compositions which produce a foamed glass structure upon firing. The glass composition, foaming agent, grit, and, if desired, grinding aid, are mixed together, formed into small agglomerates of the desired shape, fired, and cooled. The agglomerates may then be screened to appropriate sizes and employed in a conventional manner to produce coated abrasive discs, belts, or sheets. They may also be used to produce resin bonded and vitrified grinding wheels.

The present invention utilizes the basic friability of the cellular glass and its controlled variability of friability as a matrix for abrasive grit. When a cellular glass is at the appropriate foaming temperature, it expands and will stick to most materials around it. In addition, it tends to encapsulate particles in its growth path.

This latter tendency is utilized when sized abrasive grit is mixed with a foamable glass or glass forming batch and the body brought to a cellulating temperature. Surprisingly, the grit particles are readily distributed throughout the resulting multi-cellular foamed glass particle yet totally encapsulated by the glass in the cell walls.

Accordingly, mixtures of various cellular glass batches are blended with various volume percentages of grit, the blended batch is pelletized to appropriately sized green spheroids and those spheroids dried and fired to yield the abrasive aggregate.

Cellular glass is sold as a soft abrasive in its own right. Its major product qualities are its ready friability without catastrophic failure such that upon rubbing over a workpiece new sharp glass surfaces are constantly being formed. In addition, the material is impermeable so that there is no absorbtion of liquid into the structure. Abrasive agglomerate performance depends upon the friability of the matrix. Ideally, the matrix should fracture or crumble as soon as the encapsulated grain begins to lose its peak cutting quality. This invention provides a product in which fine abrasive grit is encapsulated in the foam cell walls as a discrete impurity. Ideally, the matrix should be designed to exhibit a coefficient of thermal expansion that is as close as possible to that of the abrasive grit in order to minimize cooling flaws.

The subject grit/glass mixture can be formed into extruded chopped shapes, or can be pelletized into spheres. Friability can be controlled by the ratio of pores to grain and/or the ratio of glass to grain. Higher density matrixes (60pcf+) will tend to break like a glass while lower densities than 20 pcf will increase friability beyond the point where there is sufficient matrix strength to retain the grit. Matrices having densities up to 100 pcf may be used in grinding wheels, while densities between 20 and 60 pcf. are suitable for use in coated abrasive products.

The size of the aggregates is subject to much variation, depending on the particular application and grit size, and upon the manufacturing process. Generally the aggregates will be 250 microns or larger in diameter, when fired in a rotary kiln, but may be as small as 20 microns when fired in a vertical shaft furnace. The maximum size normally used would not be over 5mm, at least in coated abrasive applications. The abrasive grit may be finer than 1 microns for the smallest aggregates, and as coarse as 2 or 3 millimeters for the coarsest aggregates.

Fused aluminum oxide, co-fused alumina-zirconia alloy abrasives, and silicon carbide or CBN (cubic boron nitride) have been used as the abrasive grit.

As shown in the example below, soda lime glass can be used, but a non-devitrifying alumino borosilicate composition is superior for most grits.

The abrasive and glass mixture for forming the agglomerates contains from 40 to 80 percent (dry bulk volume) of milled glass composition and from 20 to 60 percent of abrasive grain. Up to 20 percent addition of a grinding aid such as cryolite can be added to such mixtures. The final product, when in the form of spheres, will have a bulk density of from 20 to 55 pounds per cubic foot (0.32 to 0.88 g/cc).

The optimum firing temperature and time depends upon the particular composition used, the desired density (porosity) of the product. In general a temperature of 600 to 900 degrees C. or higher for about 20 minutes is suitable for rotary kiln firing.

DESCRIPTION OF SPECIFIC EMBODIMENTS

The steps in a typical example of this invention are as follows:

1. Preparing a foamable glass batch by ball milling a glass such as soda lime glass cullet with 0.25% carbon black and 0.5% three micron silicon carbide for 24 hours in a batch ball mill to a median particle size of five microns or less.

2. Adding a charge of 70% by volume of the foamable glass batch and 30% by volume of an abrasive grit, in particular, a 180 grit fused dark aluminum oxide and blending them dry at high speed. Subsequent to dry blending a 1% addition of alum is added as a dilute liquid and wet mixed followed by a 0.4% solids addition of an aqueous montmorillonite slurry at a 4% solids content as a binder. Sufficient additional water is added to pelletize the mix to a pellet particle size on the order of 20/40 mesh, when firing in a rotary kiln is intended.

3. The generally spherical pellets thus formed are then dried in a fluid bed dryer and dry mixed with an aluminum hydrate parting agent and fired in a rotary kiln at a temperature of about 850 degrees C. for 20 minutes.

The resultant particles exhibit a specific gravity of 30 to 35 pcf (0.48 to 0.56 g/cc). When examined microscopically, it is observed that the glass tends to encapsulate the alumina particles in a foam bubble network. It is also observed that the alumina particles tend to be concentrated in the periphery of the bubble in a manner akin to froth floatation. The particles at the surface are still covered by a layer of glass.

The particles were screened to 20/30 and 30/40 U.S. sieve fraction then tested by using them as if they were in themselves abrasive grits and making coated abrasive belts in the conventional fashion. The belts were tested in a standard metal finishing test system and compared with belts made from 180 grit dark alumina.

It was found that the initial time to achieve a comparable finish was longer for the aggregate belts than grit belts but the total amount of metal removed and the belt lifetime was between two and six times that of the grit belt standard.

Repeated testing yielded erratic results, some repeating the aforementioned performance, others substantially poorer. It was determined that the reason for the erratic performance was the tendency of the soda lime glass to devitrify and the potential for the cristobalite crystals to cause defects which sometimes caused the glass to fail. Additional testing was made using the belt with an aqueous lubricant and the resultant performance was consistently bad. It was determined that this was caused by the poor aqueous durability of the glass.

Accordingly, it was determined to use a batch that would be essentially a nondevitrifying borosilicate made from a mixture of clay or volcanic ash and chemical additives similar to that described in U.S. Pat. No. 3,793,039. A mix of 66% volcanic ash, 15% kaolin clay, 5.5% 5 mole borax, 8% dolomite, 2.7% lithium carbonate, 2% sodium bicarbonate and ¼% carbon black was comilled. A 1% addition of liquid alum was made prior to pelletizing. The resultant pellets when fired at 930° C. exhibited performance essentially similar to those made from melted glass cullet which tested more reproducibly. In addition, when tested in a wet environment, the performance was reduced but still better than that of a conventional belt made with 180 grit. The alumino borosilicate has enhanced aqueous durability.

Instead of all glass forming minerals the foamable glass raw batch may be a mixture of glass and glass formers, if a preformed glass batch is not preferred.

It was further found that a 10% addition of powdered cryolite enhanced the cutting performance. Cryolite is a well-known grinding aid for metals and is apparently encapsulated in a fashion similar to that of the alumina grit.

The following examples show that silicon carbide or co-fused alumina-zirconia abrasive grits can be used.

The first experiment used the standard soda lime glass foam mix to which we added 30% 39 Crystolon 180 grit and 10% fine cryolite. The product was foamed at about 850 degrees C. The resultant aggregate was lighter than that made from alumina, its bulk density being 22.4 pcf @ 12/20 vs. 27-29 pcf @ 12/20 but seemed otherwise similar. It was observed that the SiC grit particles tended to migrate to the bubble periphery leaving large voids in the center and a thick grit filled shell, containing closed pores (cells).

The second experiment used the same ingredients as for alumina grit as above except that 80 grit cofused alumina-zirconia containing 40% zirconia was used (180 grit was not available). The resultant aggregate was essentially equivalent to alumina in visual properties in that the grit was uniformly distributed throughout the bubble. The process of forming a cellular glass matrix is very fast (less than ten minutes) and almost fully reducing. Thus, the normally oxidation sensitive grit is not damaged in firing and performs as well as grits that have not been subjected to equivalent temperatures. The cut life performance of belts on which encapulated grits are coated is superior to that of belts made from non-encapulated grits. Thus the advantages of encapsulation are achieved without oxidative degradation of the abrasive material during the formation of the aggregates.

This result is significant because co-fused alumina-zirconia abrasive material of the type useful in coated abrasive or other moderate duty applications contains partially reduced compounds of zirconia and of alumina which are present at the internal grain boundaries of the grits. Such reduced metals or metal compounds are produced during the fusion process for making the grits and are believed to be essential to the optimum performance of the material.

Thus, it can be shown that other abrasives can be encapsulated into aggregates as was alumina.

Coated abrasive products are made from the agglomerates of this invention by bonding the aggregates in a single layer on a flexible backing sheet by conventional means well-known in the art, employing thermosetting maker and size coats, glue, or a combination of glue and resin.

It has been found that silicon carbide containing aggregates, for purposes such as the grinding of titanium metal, are clearly superior to conventional silicon carbide coated abrasive products.

Additionally it has been determined that when glass forming chemical mixes, rather than pre-melted and ground glass, are used in the formation of the aggregates, superior wetting of the abrasive can be achieved. In addition the resulting aggregate is different in structure from the typical glass containing mixes. In the case of the glass forming mixes, the abrasive particles are more uniformly dispersed within the multi-cellular aggregate body, as compared to the glass mixes in which the abrasive particles tend to be concentrated in the outer peripheral cell walls of the multi-cellular matrix.

In a reduction to practice a foamable blend of glass batch, at 70%, 180 grit green SiC at 30% was mixed dry. To this mix 1% alum on a dry solids basis in aqueous solution was added, followed by enough (0.4%) montmorillonite aqueous slurry to pelletize to a 20/40 mesh size. These generally spherical particles were dried and fired at 850° C. for 20 minutes in a rotary kiln. If desired a 10 to 20% addition of cryolite as a grinding aid can be added at the dry mixing stage.

The fired particles were coated on a belt in the standard fashion and tested dry in finishing titanium metal and wet in finishing plate glass. In both cases there was a longer break-in period than that of a regular SiC belt but the useful cut life was much longer. In the case of titanium a standard belt cut 16 gm while the experimental nodule belt cut a total of 245 gm. The wet cutting of glass was similar: 18 gm vs 180 gm for the experimental nodule belt.

In a further reduction to practice a lower temperature maturing batch containing as weight %, 32 borax pentahydrate; 27 kaolin; 25 volcanic ash; 6.5 precipitated silica; 1.7 calcium carbonate; 3.5 lithium carbonate; 1.0 potassium hydroxide; 0.2 sodium acetate; 0.25 carbon black was co-milled in a ball mix. Pellets were mixed with 120 grit alumina zirconia and fine cryolite, then additions made of 0.5% alum as a diluted liquid, 0.5% bentonite as a colloidal suspension at 2% and as much additional water as needed to make satisfactory pellets. The ratio of grit/bond/cryolite was 45/34/6-3/4. The pellets were dried then fired at 620° C. to a density of 45 pcf screened to 10/20 mesh and used to make a fiber disc. The discs were used to finish 1020 steel and exhibited a cut life 10 times that of a conventional 120 grit disc.

A further reduction to practice used the batch described on page 5 with 0.05% carbon rather than 0.25% and no liquid alum; 80 grit white aluminim oxide was used as grit on a ratio of grit/batch of 1.3/1 by weight. The pellets were fired at 900° C. to a density of 70 pcf. These pellets were put into a vitrifiable mix in which the bond was less refractory than the batch described. Using conventional practice a grinding wheel was formed from the mix and fired at about 880° C. The resultant vitrified grinding wheel with 16 volume % abrasive exhibited similar cut rate on mild steel to a regular grinding wheel with equivalent grit at 46 volume % abrasive.

An additional reduction to practice used the batch described on page 5, 180 grit silicon carbide and 10% fine cryolite in ratio 45/34/6-3/4 grit/bond/cryolite by weight. When fired in a rotary furnace at 900° to 925° C. the grit tended to stay dispersed in the bubble but when the temperature was raised to 990° C. and kept just below the point where the bubbles tended to stick to each other the structure tended to a single or double layer central void and most of the grit concentrated in the periphery of the bubble. The walls of the bubble contained both micro and macro pores as shown in the drawing.

What is claimed is:

1. Abrasive agglomerate particles comprising a matrix of multi-cellular foamed glass and abrasive grit particles encapsulated within the cell walls of said glass.

2. Abrasive agglomerates as in claim 1 in which the abrasive grit is oxidation sensitive.

3. Abrasive agglomerates as in claim 1 in which said agglomerates include particles of cryolite.

4. Abrasive aggregates as in Claim 1 having a specific gravity of from 0.32 to 0.88 grams/cc.

5. Abrasive agglomerates as in claim 1 having a generally spherical shape.

6. Abrasive agglomerates as in claim 1 in which the glass is an aluminum borosilicate composition.

7. Abrasive agglomerates as in claim 1 in which the glass contains particles of cryolite, and the abrasive grits are fused aluminum oxide.

8. Abrasive agglomerates according to claim 1 in which the abrasive grit particles are present in greatest concentration in the exterior cells of the foamed glass.

9. A coated abrasive sheet material made by adhesively bonding the agglomerates of claim 1 to a flexible backing.

10. A method of making abrasive agglomerate particles comprising mixing abrasive grits with a foamable glass raw batch, forming the mixture into shaped particles, and firing said particles to foaming temperature, and cooling to room temperature.

11. A method as in claim 10 in which the firing takes place in a vertical shaft furnace.

12. A method as in claim 10 in which the foamable glass raw batch contains mineral precursors to form glass.

13. Agglomerates of cylindrical or spherical multicellular-glass bonded abrasive grits made according to the process of claim 10.

14. Abrasive agglomerates according to the process of claim 10 containing abrasive grits which are oxidation sensitive.

15. A ceramic bonded grinding wheel containing the abrasive agglomerates of claim 10.

16. A resin bonded grinding wheel containing the abrasive agglomerates of claim 10.

17. A ceramic bonded grinding wheel containing the abrasive agglomerates of claim 10 in which the abrasive is co-fused alumina zirconia.

18. A ceramic bonded grinding wheel containing the abrasive agglomerates of claim 1.

19. A resin bonded grinding wheel containing the abrasive agglomerates of claim 1.

20. A ceramic bonded grinding wheel containing the abrasive agglomerates of claim 1 in which the abrasive is co-fused alumina zirconia.

* * * * *